United States Patent
Harding et al.

(10) Patent No.: US 10,674,101 B2
(45) Date of Patent: Jun. 2, 2020

(54) IMAGING DEVICES FOR USE WITH ADDITIVE MANUFACTURING SYSTEMS AND METHODS OF IMAGING A BUILD LAYER

(71) Applicant: General Electric Company, Schenectady, NY (US)

(72) Inventors: Kevin George Harding, Niskayuna, NY (US); Jason Harris Karp, Niskayuna, NY (US); James William Sears, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 116 days.

(21) Appl. No.: 15/663,181

(22) Filed: Jul. 28, 2017

(65) Prior Publication Data
US 2018/0124341 A1    May 3, 2018

Related U.S. Application Data

(60) Provisional application No. 62/414,495, filed on Oct. 28, 2016.

(51) Int. Cl.
*H04N 5/369* (2011.01)
*B29C 64/153* (2017.01)
(Continued)

(52) U.S. Cl.
CPC ....... *H04N 5/3694* (2013.01); *B28B 17/0072* (2013.01); *B29C 64/153* (2017.08); *B29C 64/205* (2017.08); *B29C 64/214* (2017.08); *B29C 64/277* (2017.08); *B33Y 10/00* (2014.12); *B33Y 30/00* (2014.12);
(Continued)

(58) Field of Classification Search
USPC .......................................................... 348/92
See application file for complete search history.

(56) References Cited

U.S. PATENT DOCUMENTS

| 6,815,636 B2 | 11/2004 | Chung et al. |
| 8,508,809 B2 | 8/2013 | Hock |

(Continued)

FOREIGN PATENT DOCUMENTS

| EP | 2 773 094 A1 | 9/2014 |
| WO | 2016/115095 A1 | 7/2016 |

OTHER PUBLICATIONS

Jacobsmuhlen, J.Z., et al., "High Resolution Imaging for Inspection of Laser Beam Melting Systems," IEEE International Instrumentation and Measurement Technology Conference (I2MTC), pp. 1-6 (2013).

(Continued)

*Primary Examiner* — Alexander Gee
(74) *Attorney, Agent, or Firm* — Armstrong Teasdale LLP (57) ABSTRACT

An imaging device for an additive manufacturing system is provided. The additive manufacturing system includes a material. The imaging device includes a high resolution imaging bar including at least one detector array, and an imaging element positioned between the at least one detector array and the material. The high resolution imaging bar is displaced from the material along a first direction and extends along a second direction. The high resolution imaging bar is configured to generate an image of a build layer within the material.

14 Claims, 4 Drawing Sheets

(51) Int. Cl.
| | |
|---|---|
| *B29C 64/214* | (2017.01) |
| *B29C 64/277* | (2017.01) |
| *G01N 21/84* | (2006.01) |
| *B33Y 10/00* | (2015.01) |
| *B33Y 30/00* | (2015.01) |
| *B29C 64/205* | (2017.01) |
| *B28B 17/00* | (2006.01) |
| *H04N 1/03* | (2006.01) |
| *H04N 1/00* | (2006.01) |
| *H04N 5/225* | (2006.01) |
| *B22F 3/105* | (2006.01) |
| *H04N 1/028* | (2006.01) |
| *B33Y 50/02* | (2015.01) |
| *B29C 64/393* | (2017.01) |
| *B28B 1/00* | (2006.01) |
| *C03B 19/01* | (2006.01) |

(52) U.S. Cl.
CPC ..... *G01N 21/8422* (2013.01); *H04N 1/00827* (2013.01); *H04N 1/0306* (2013.01); *H04N 5/2256* (2013.01); *B22F 3/1055* (2013.01); *B22F 2003/1056* (2013.01); *B22F 2003/1057* (2013.01); *B22F 2999/00* (2013.01); *B28B 1/001* (2013.01); *B29C 64/393* (2017.08); *B33Y 50/02* (2014.12); *C03B 19/01* (2013.01); *G01N 2021/8427* (2013.01); *G01N 2201/1085* (2013.01); *G05B 2219/37558* (2013.01); *H04N 1/02865* (2013.01); *H04N 2201/0084* (2013.01); *Y02P 10/295* (2015.11)

(56) References Cited

U.S. PATENT DOCUMENTS

| | | | |
|---|---|---|---|
| 9,248,623 B2* | 2/2016 | Pettis | B29C 64/20 |
| 2004/0173946 A1* | 9/2004 | Pfeifer | B33Y 10/00 |
| | | | 264/497 |
| 2009/0206065 A1 | 8/2009 | Kruth et al. | |
| 2011/0061591 A1* | 3/2011 | Stecker | B22F 3/1055 |
| | | | 118/663 |
| 2014/0364858 A1* | 12/2014 | Li | A61F 2/4609 |
| | | | 606/91 |
| 2015/0165683 A1 | 6/2015 | Cheverton et al. | |
| 2015/0177158 A1* | 6/2015 | Cheverton | G01N 15/0227 |
| | | | 700/119 |
| 2015/0266242 A1 | 9/2015 | Comb et al. | |
| 2016/0114431 A1 | 4/2016 | Cheverton et al. | |
| 2016/0144570 A1* | 5/2016 | Kim | B29C 35/0805 |
| | | | 425/174.4 |
| 2016/0159011 A1* | 6/2016 | Marchione | B29C 64/386 |
| | | | 700/98 |
| 2016/0179064 A1 | 6/2016 | Arthur et al. | |
| 2016/0320532 A1* | 11/2016 | Purchase | G02B 5/0231 |
| 2016/0344948 A1* | 11/2016 | Bamberg | G06T 7/0004 |
| 2017/0235293 A1* | 8/2017 | Shapiro | B23K 37/0235 |
| | | | 700/166 |
| 2017/0239719 A1* | 8/2017 | Buller | B29C 64/40 |
| 2018/0311898 A1* | 11/2018 | Schwarzbaum | B29C 35/0805 |
| 2019/0118474 A1* | 4/2019 | Hikmet | B33Y 10/00 |

OTHER PUBLICATIONS

Jacobsmuhlen, J.Z., et al., "Robust Calibration Marker Detection in Powder Bed Images from Laser Beam Melting Processes," IEEE International Conference on Industrial Technology (ICIT), pp. 910-915 (2016).

Jiang, S., et al., "Research on Measuring and Control System of Metal Powder Laser Shaping," IEEE International Conference on Mechatronics and Automation, pp. 1717-1721 (Jun. 25-28, 2006).

International Search Report and Written Opinion issued in connection with corresponding PCT Application No. PCT/US2017/55851 dated Feb. 5, 2018.

* cited by examiner

IMAGING DEVICES FOR USE WITH ADDITIVE MANUFACTURING SYSTEMS AND METHODS OF IMAGING A BUILD LAYER

CROSS REFERENCE TO RELATED APPLICATIONS

This application claims the benefit of U.S. Provisional Patent Application No. 62/414,495, filed Oct. 28, 2016, which is hereby incorporated by reference in its entirety.

BACKGROUND

The field of the disclosure relates generally to additive manufacturing systems and, more specifically, to imaging devices for use with additive manufacturing systems and methods of imaging a build layer.

Additive manufacturing systems and processes are used to fabricate precision three-dimensional components from a digital model. Such components are fabricated using an additive process, where successive layers of material are solidified one on top of the other. At least some known additive manufacturing systems use a laser (or similar energy sources) and a series of lenses and mirrors to direct the laser over a powdered material in a predetermined pattern. Some known additive manufacturing systems include Direct Metal Laser Melting (DMLM), Selective Laser Sintering (SLS), Direct Metal Laser Sintering (DMLS), Selective Laser Melting (SLM), and LaserCusing systems.

In some known additive manufacturing systems, layer and component quality is reduced due to excess heat and/or variation in heat being transferred to the metal powder by the focused laser within the melt pool. For example, sometimes local overheating occurs, particularly at overhangs, or local under heating occurs, leaving powdered build material with the solidified layer. In addition, in some known additive manufacturing systems, layer and component quality is further reduced due to the variation in conductive heat transfer between the powdered metal and the surrounding solid material of the components. For example, the melt pool produced by the focused laser sometimes becomes too large, resulting in the melted metal spreading into the surrounding powdered metal, as well as the melt pool penetrating deeper into the powder bed, thereby pulling additional powder into the melt pool and resulting in undesired contouring within the solidified layer. In addition, in some known additive manufacturing systems, the layer and component dimensional accuracy and small feature accuracy is reduced due to melt pool variations because of the variability of thermal conductivity of subsurface structures and metallic powder. As the melt pool size varies, the accuracy of the printed structures varies, especially around the edges of features.

Moreover, layer and component quality in some known additive manufacturing systems is reduced by an uneven and/or disrupted metal powder layer that is disposed on top of the previously built solidified layer. For example, from an uneven metal powder layer, the focused laser forms a contoured solidified layer. Additionally, layer and component quality in some known additive manufacturing systems is reduced through layer misalignment.

At least some known additive manufacturing systems include imaging devices to generate images of portions of the melt pool and/or solidified layer during the fabrication process. The imaging devices typically include a static camera with low exposure that tracks the focused laser to capture light during the melting process and/or a static camera that images the solidified layer. However, these imaging devices generate images of only portions of the melt pool and/or solidified layer and without reference to specific positions. Additionally, the imaging devices may be limited by their resolution to see feature changes on larger components. For example, some known imaging devices include 16 million pixels, but these are limited in resolution and capture feature changes on the layer only at a scale of approximately a millimeter, thereby limiting the device in capturing smaller feature changes. As such, early detection of problems in component quality is reduced.

BRIEF DESCRIPTION

In one aspect, an imaging device for an additive manufacturing system is provided. The additive manufacturing system includes a material. The imaging device includes a high resolution imaging bar including at least one detector array, and an imaging element positioned between the at least one detector array and the material. The high resolution imaging bar is displaced from the material along a first direction and extends along a second direction. The high resolution imaging bar is configured to generate an image of a build layer within the material.

In another aspect, an additive manufacturing system is provided. The additive manufacturing system includes a material for forming a component and an imaging device. The imaging device includes a high resolution imaging bar including at least one detector array, and an imaging element positioned between the at least one detector array and the material. The high resolution imaging bar is displaced from the material along a first direction and extends along a second direction. The high resolution imaging bar is configured to generate an image of a build layer within the material.

In yet another aspect, a method of imaging a build layer within a material within an additive manufacturing system is provided. The method includes positioning an imaging device, including a high resolution imaging bar such that the imaging device is displaced from the material in a first direction and extends along a second direction, the high resolution imaging bar including at least one detector array and an imaging element positioned between the at least one detector array and the material, moving the imaging device along a third direction, and generating an image of the build layer.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, a programmable logic controller (PLC), and application specific integrated circuit, and other programmable circuits, and these terms are used interchangeably herein. In the embodiments described herein, memory may include, but it not limited to, a computer-readable medium, such as a random access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method of technology for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including without limitation, volatile and non-volatile media, and removable and non-removable media such as firmware, physical and virtual storage, CD-ROMS, DVDs, and any other digital source such as a network or the Internet, as well as yet to be developed digital means, with the sole exception being transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

Embodiments of the present disclosure relate to imaging devices for use with additive manufacturing systems that provide a more effective and higher resolution imaging for larger additively manufactured components. Specifically, in the exemplary embodiments, the imaging device includes a high resolution imaging bar that extends across a material to be consolidated. The high resolution imaging bar is configured to generate an image of a build layer within the material and includes at least one detector array and an imaging element positioned between the at least one detector array and the material. The imaging device may be able to image a desired region of the material while stationary, or it may be coupled to a re-coating device assembly of the additive manufacturing system. As such, the high resolution imaging bar facilitates imaging the entirety of the material and detecting build layer features therein at resolutions that are on a scale of a tenth of a millimeter or better. By using the high resolution imaging bar, build layer features such as misalignment of the component, unevenness of the material, melt variations, and melt splatter are capable of being detected and addressed. Additionally, contours, such as balling or dome shaping, are also captured through an angled light source configuration. As such, the imaging systems described herein facilitate capturing more information than known static low exposure cameras. As such, the images that are compared to the electronic representation files of the component for verification enable earlier detection of potential problem areas during the additive manufacturing process, thereby, resulting in an additively manufactured component of increased quality. Additionally, early detection results in more time to correct problem areas of the component during the additive manufacturing process. Moreover, the early detection results enable unsalvageable parts to be discarded early in the manufacturing process, saving manufacturing time and material costs.

Additive manufacturing processes and systems include, for example, and without limitation, vat photopolymerization, powder bed fusion, binder jetting, material jetting, sheet lamination, material extrusion, directed energy deposition and hybrid systems. These processes and systems include, for example, and without limitation, SLA—Stereolithography Apparatus, DLP—Digital Light Processing, 3SP—Scan, Spin, and Selectively Photocure, CLIP—Continuous Liquid Interface Production, SLS—Selective Laser Sintering, DMLS—Direct Metal Laser Sintering, SLM—Selective Laser Melting, EBM—Electron Beam Melting, SHS—Selective Heat Sintering, MJF—Multi-Jet Fusion, 3D Printing, Voxeljet, Polyjet, SCP—Smooth Curvatures Printing, MJM—Multi-Jet Modeling Projet, LOM—Laminated Object Manufacture, SDL—Selective Deposition Lamination, UAM—Ultrasonic Additive Manufacturing, FFF—Fused Filament Fabrication, FDM—Fused Deposition Modeling, LMD—Laser Metal Deposition, LENS—Laser Engineered Net Shaping, DMD—Direct Metal Deposition, Hybrid Systems, and combinations of these processes and systems. These processes and systems may employ, for example, and without limitation, all forms of electromagnetic radiation, heating, sintering, melting, curing, binding, consolidating, pressing, embedding, and combinations thereof.

Additive manufacturing processes and systems employ materials including, for example, and without limitation, polymers, plastics, metals, ceramics, sand, glass, waxes, fibers, biological matter, composites, and hybrids of these materials. These materials may be used in these processes and systems in a variety of forms as appropriate for a given material and the process or system, including, for example, and without limitation, as liquids, solids, powders, sheets, foils, tapes, filaments, pellets, liquids, slurries, wires, atomized, pastes, and combinations of these forms.

Figure 1:
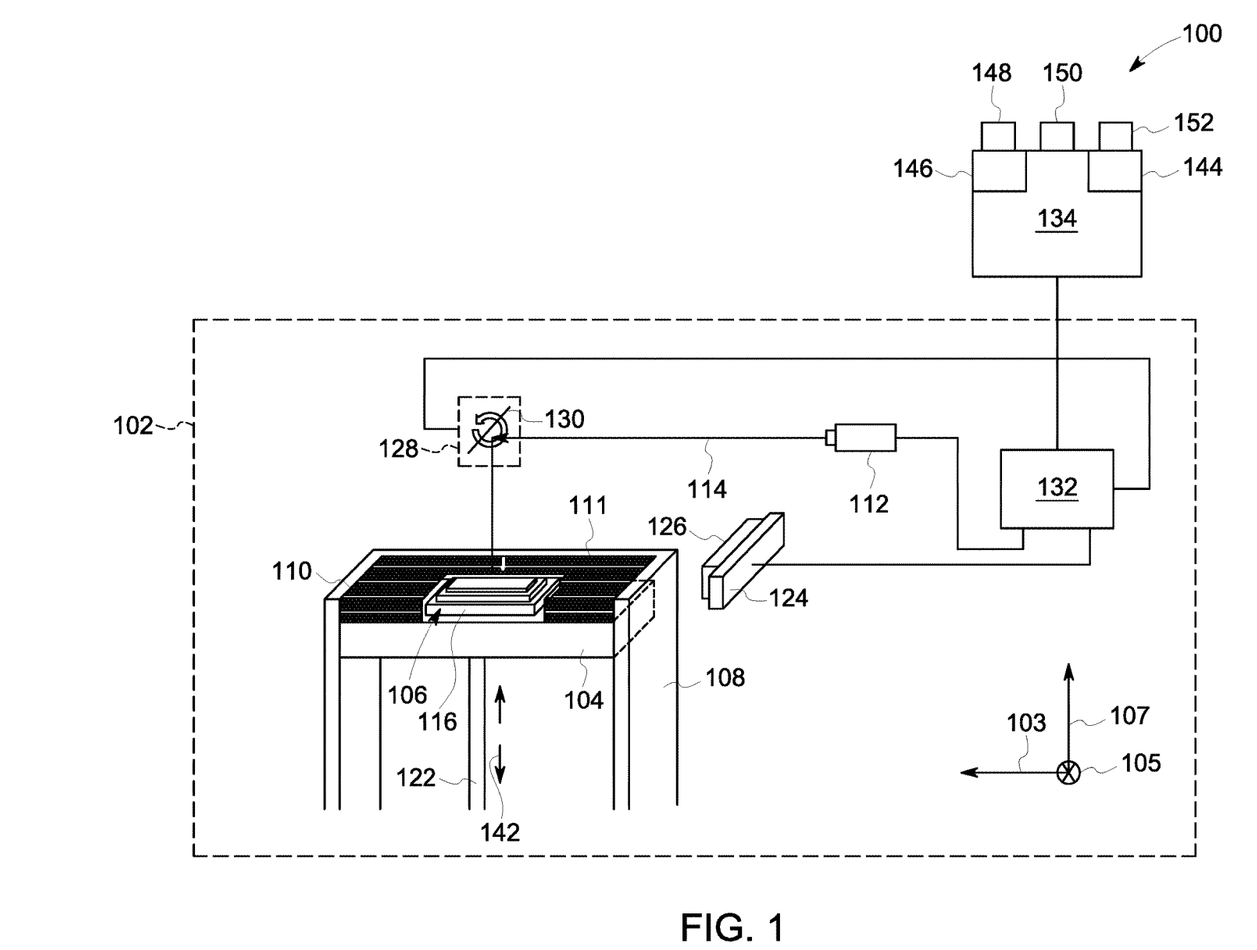
FIG. 1 is a schematic view of an exemplary additive manufacturing system.

FIG. 1 is a schematic view of an exemplary additive manufacturing system 100. In the exemplary embodiment, additive manufacturing system 100 is a direct metal laser melting (DMLM) system. A longitudinal, or third, axis 103 of additive manufacturing system 100 extends through additive manufacturing system 100 in the direction of travel of a re-coating device 124. A transverse, or second, axis 105 extends in a plane substantially parallel to a build platform 104 and normal to third axis 103. A vertical, or first, axis 107 extends in a direction that is normal to third axis 103 and normal to second axis 105. Third axis 103, second axis 105, and first axis 107 are orthogonal to each other. Although the embodiments herein are described with reference to DMLM systems, this disclosure may also apply to other types of additive manufacturing systems, such as liquid-resin based additive manufacturing systems (e.g., stereolithograpy systems) or selective laser melting systems.

In the exemplary embodiment, additive manufacturing system 100 includes an additive manufacturing device 102. Additive manufacturing device 102 includes build platform 104 for supporting a three-dimensional component 106 during the additive manufacturing process, a reservoir 108 of particulate build material 110, also known as a powder bed 111, and an energy source 112. Energy source 112 emits an energy beam 114 for sintering, curing, hardening, or otherwise solidifying a portion of powder bed 111 to form a plurality of superposed build layers 116 to form three-dimensional component 106. A front wall of reservoir 108 is omitted in FIG. 1 for clarity. Similarly, portions of powder bed 111 are omitted in FIG. 1 for clarity. In the exemplary embodiment, three-dimensional component 106 is an aircraft component, although additive manufacturing system 100 may be used to fabricate any three-dimensional component. Build platform 104 is coupled to vertical adjuster 122 such that build platform 104 may be raised and/or lowered to adjust the plane in which each build layer 116 is to be solidified.

In the exemplary embodiment, energy source 112 is a laser device. More specifically, energy source 112 is a laser device such as a yttrium-based solid state laser configured to emit energy beam 114 having a wavelength of about 1070 nanometers (nm). In alternative embodiments, energy source 112 may be any suitable energy source for sintering, curing, hardening, or otherwise solidifying build layer 116, such as, for example, an ultraviolet laser, a gas laser, such as a carbon dioxide ($CO_2$) laser, a light source, or an electron beam generator. In alternative embodiments, additive manufacturing system 100 includes two or more energy sources 112 that have similar or different powers that enables additive manufacturing system 100 to function as described herein. Further, in the exemplary embodiment, particulate build material 110 is a metallic powder. More specifically, particulate build material 110 is a gas atomized metal powder (e.g., cobalt, iron, aluminum, titanium and/or nickel alloys) having a mean particle size within a range of between approximately 10 and 100 microns.

Additive manufacturing device 102 also includes a build material dispenser and distribution device, also known as a re-coating device 124, for providing a thin layer of particulate build material 110 over component 106. Coupled to re-coating device 124 is an imaging device 126 that is discussed in further detail below in reference to FIG. 2. Additionally, in the exemplary embodiment, additive manufacturing device 102 includes a consolidation device 128 for moving energy beam 114 over selective portions of powder bed 111 in a process known as "scanning". In the exemplary embodiment, consolidation device 128 includes one or more galvanometers 130 and/or one or more motorized mirrors, lenses and/or other optical devices.

One or more of build platform 104, re-coating device 124, imaging device 126, consolidation device 128, and energy source 112 are communicatively coupled to a controller 132. In the exemplary embodiment, consolidation device 128, energy source 112, imaging device 126, and re-coating device 124 are communicatively coupled to controller 132. Also, in the exemplary embodiment, controller 132 is communicatively coupled to a computing device 134.

In operation, additive manufacturing system 100 fabricates three-dimensional component 106 by a layer-by-layer manufacturing process. More specifically, three-dimensional component 106 is fabricated from an electronic representation of the three-dimensional geometry of three-dimensional component 106 stored on computing device 134. For example, the electronic representation is produced in a computer aided design (CAD) or similar electronic file. In alternative embodiments, the electronic representation is any electronic representation that enables additive manufacturing system 100 to operate as described herein. In the exemplary embodiment, the CAD file representing three-dimensional component 106 is converted, for example, by computing device 134, into a layer-by-layer format that includes a plurality of build parameters of each build layer 116. Three-dimensional component 106 is arranged in a desired orientation relative to the origin of the coordinate system used in additive manufacturing system 100. Additionally, the geometry of three-dimensional component 106 is sliced into a stack of two-dimensional build layers 116 of a desired thickness, such that the geometry of each build layer 116 is an outline of the cross-section through three-dimensional component 106 at that particular build layer 116 location. A hatch pattern is generated within each respective build layer 116 such that the build parameters are applied along the hatch pattern to fabricate that build layer 116 of three-dimensional component 106 from particulate build material 110. The steps are repeated for each respective build layer 116. Once the process is completed, an electronic computer build file (or files) is generated including electronic representations of all build layers 116.

After the build file is generated, additive manufacturing system 100 is operated to manufacture three-dimensional component 106 by implementing the layer-by-layer manufacturing process plan. The exemplary layer-by-layer manufacturing process does not use a pre-existing article as the precursor to the final component, rather the process produces three-dimensional component 106 from a raw material in a configurable form, such as powdered particulate build material 110. For example, and without limitation, a steel alloy material may be additively manufactured using a steel alloy powder. Additive manufacturing system 100 enables fabrication of components 106 using a broad range of materials, for example, metals, ceramics, and polymers.

As used herein, the term "parameter" refers to characteristics that are used to define the operating conditions of additive manufacturing system 100, such as a power output of energy source 112, a vector scanning speed of energy source 112, a raster power output of energy source 112, a raster scanning speed of energy source 112, a raster tool path of energy source 112, and a contour power output of energy source 112 within additive manufacturing system 100. In some embodiments, the parameters are initially input by a user into computing device 134. The parameters represent a given operating state of additive manufacturing system 100. In general, during raster scanning, energy beam 114 is scanned sequentially along a series of substantially straight hatch lines spaced apart and parallel to each other. During vector scanning, energy beam 114 is generally scanned sequentially along a series of substantially straight hatch lines or vectors, wherein the orientation of the vectors relative to each other sometimes varies. In general, the ending point of one vector coincides with the beginning point of the next vector. Vector scanning is generally used to define the outer contours of component 106, whereas raster scanning is generally used to "fill" the spaces enclosed by the contour, where three-dimensional component 106 is solid.

During operation of additive manufacturing system 100, re-coating device 124 is positioned adjacent to build platform 104. Re-coating device 124 extends along the second direction across powder bed 111 and translates along the third direction during the re-coat process. As re-coating device 124 moves along third axis 103, re-coating device 124 deposits and distributes a layer of particulate build material 110 on build platform 104, forming build layer 116. After formation of build layer 116, energy source 112 channels energy beam 114 through consolidation device 128 to direct energy beam 114 over selective portions of build layer 116. For example, galvanometer 130 of consolidation device 128 directs energy beam 114 over selective portions of build layer 116, forming a new portion of three-dimensional component 106. For each build layer 116, build platform 104, through vertical adjuster 122, moves powder bed 111 downward along the first direction such that re-coating device 124 can make another pass across component 106 to deposit and distribute another build layer 116 of particulate build material 110 and to facilitate forming another portion of three-dimensional component 106. This process is then repeated for a plurality of build layers 116 to form three-dimensional component 106. In conjunction with re-coating device 124 moving along third axis 103 of powder bed 111, imaging device 126 is used to record and/or store visible wave length data images of each build layer 116 and resulting component 106 surface. The generated images are then compared to the electronic computer build files to verify the manufacturing process. Imaging device 126 is discussed in further detail below in reference to FIG. 2.

In the exemplary embodiment, build platform 104, energy source 112, re-coating device 124, imaging device 126, and consolidation device 128 are operatively controlled by controller 132. Controller 132 is any controller typically provided by a manufacturer of additive manufacturing system 100 to control operation thereof. Controller 132 is operatively coupled to computing device 134. In alternative embodiments, controller 132 is a computer system that includes at least one processor and at least one memory device.

Computing device 134 includes at least one memory device 144 and at least one processor 146 coupled to memory device 144. In some embodiments, processor 146 includes one or more processing units, such as, without limitation, a multi-core configuration. In the exemplary embodiment, processor 146 includes a field programmable gate array (FPGA). Alternatively, processor 146 is any type of processor that permits computing device 134 to operate as described herein. In some embodiments, executable instructions are stored in memory device 144. Computing device 134 is configurable to perform one or more operations described herein by processor 146. For example, processor 146 is programmed by encoding an operation as one or more executable instructions and providing the executable instructions in memory device 144. In the exemplary embodiment, memory device 144 is one or more devices that enable storage and retrieval of information such as executable instructions or other data. In some embodiments, memory device 144 includes one or more computer readable media, such as, without limitation, random access memory (RAM), dynamic RAM, static RAM, a solid-state disk, a hard disk, read-only memory (ROM), erasable programmable ROM, electrically erasable programmable ROM, or non-volatile RAM memory. The above memory types are exemplary only, and are thus not limiting as to the types of memory usable for storage of a computer program.

In the exemplary embodiment, memory device 144 is configured to store build parameters including, without limitation, real-time and historical build parameter values, or any other type of data. In the exemplary embodiment, memory device 144 stores images generated by imaging device 126. In alternative embodiments, memory device 144 stores any data that enable additive manufacturing system 100 to operate as described herein. In some embodiments, processor 146 removes or "purges" data from memory device 144 based on the age of the data. For example, processor 146 overwrites previously recorded and stored data associated with a subsequent time or event. In addition, or alternatively, processor 146 removes data that exceeds a predetermined time interval. In addition, memory device 144 includes, without limitation, sufficient data, algorithms, and commands to facilitate monitoring and measuring of build parameters and the geometric conditions of three-dimensional component 106 fabricated by additive manufacturing system 100.

Computing device 134 also includes a presentation interface 148 coupled to processor 146. Presentation interface 148 presents information, such as images generated by imaging device 126, to a user. In one embodiment, presentation interface 148 includes a display adapter (not shown) coupled to a display device (not shown), such as a cathode ray tube (CRT), a liquid crystal display (LCD), an organic LED (OLED) display, or an "electronic ink" display. In some embodiments, presentation interface 148 includes one or more display devices. In addition, or alternatively, presentation interface 148 includes an audio output device (not shown), for example, without limitation, an audio adapter or a speaker (not shown).

In the exemplary embodiment, computing device 134 includes a user input interface 150. In the exemplary embodiment, user input interface 150 is coupled to processor 146 and receives input from the user. In some embodiments, user input interface 150 includes, for example, without limitation, a keyboard, a pointing device, a mouse, a stylus, a touch sensitive panel, such as, without limitation, a touch pad or a touch screen, and/or an audio input interface, such as, without limitation, a microphone. In further embodiments, a single component, such as a touch screen, functions as both a display device of presentation interface 148 and user input interface 150.

A communication interface 152 is coupled to processor 146 and is configured to be coupled in communication with one or more other devices, such as controller 132, and to perform input and output operations with respect to such devices while performing as an input channel. For example, in some embodiments, communication interface 152 includes, without limitation, a wired network adapter, a wireless network adapter, a mobile telecommunications adapter, a serial communication adapter, or a parallel communication adapter. Communication interface 152 receives a data signal from or transmits a data signal to one or more remote devices.

Presentation interface 148 and communication interface 152 are both capable of providing information suitable for use with the methods described herein, such as, providing information to the user or processor 146. Accordingly, presentation interface 148 and communication interface 152 are referred to as output devices. Similarly, user input interface 150 and communication interface 152 are capable of receiving information suitable for use with the methods described herein and are referred to as input devices.

Figure 2:
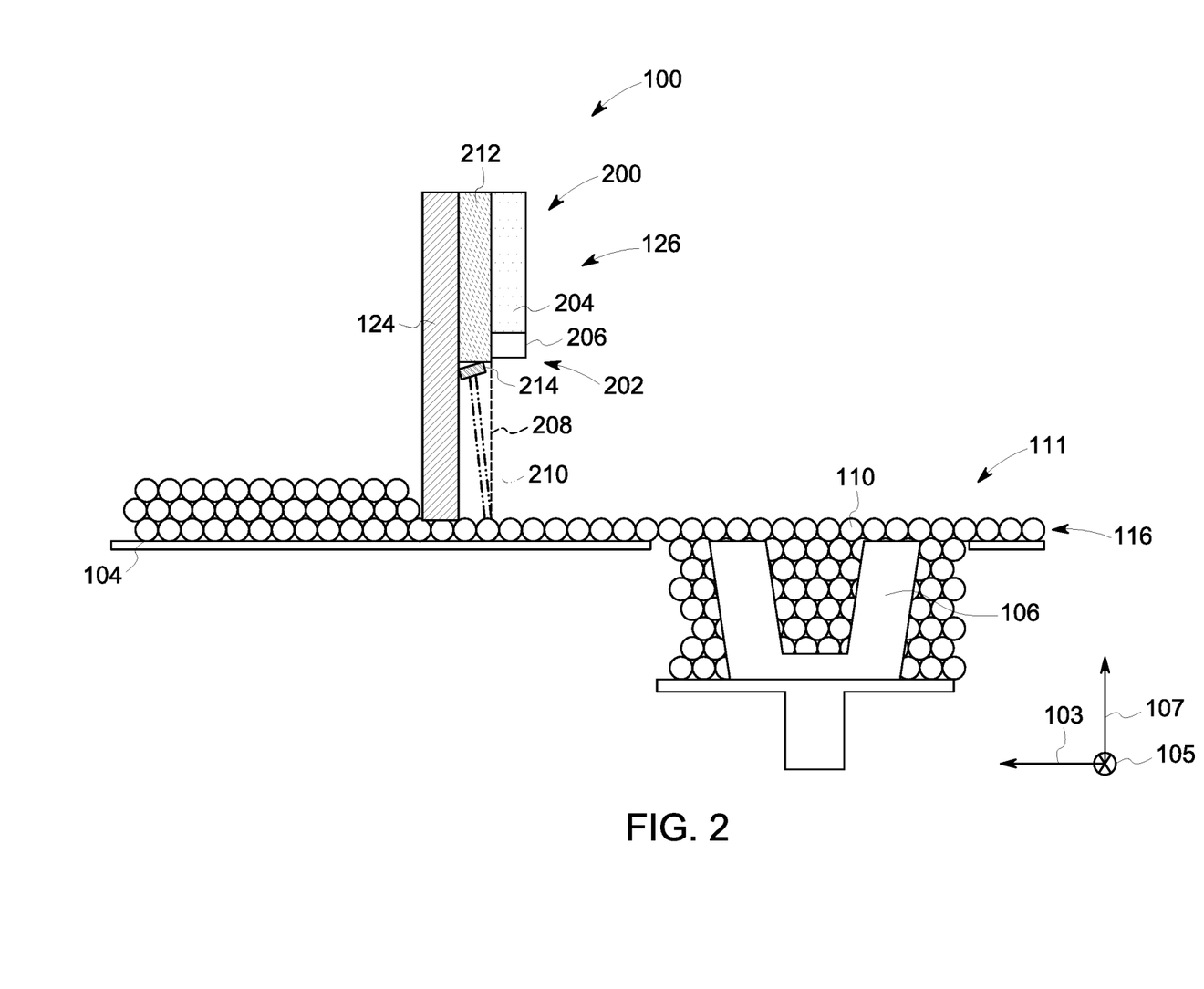
FIG. 2 is a schematic view of a portion of the system shown in FIG. 1 including an exemplary imaging device.
Figure 3:
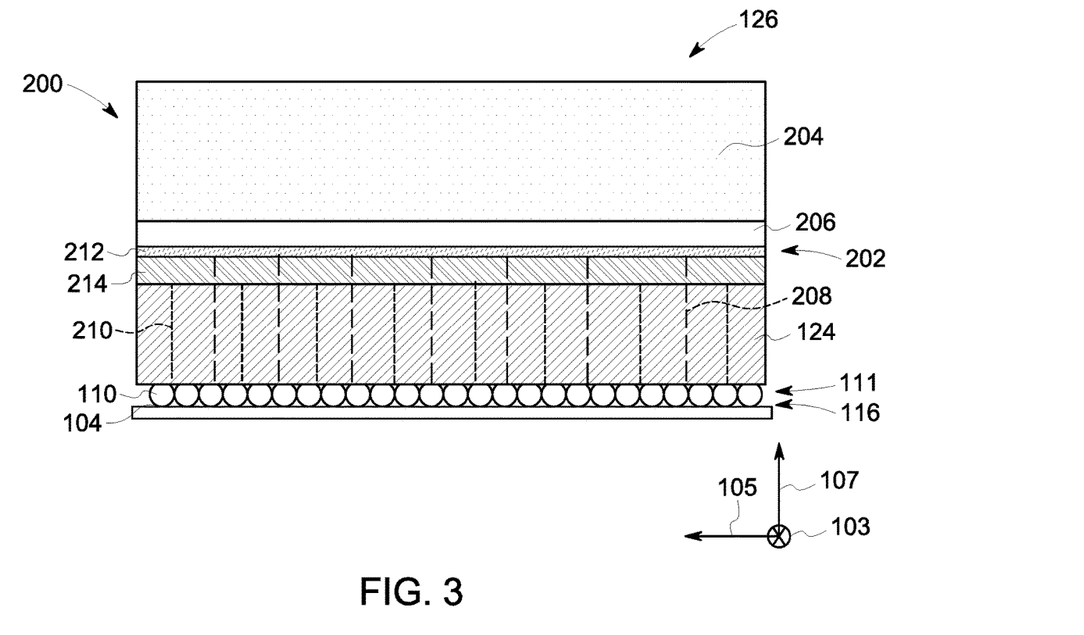
FIG. 3 is a schematic front view of the of the imaging device shown in FIG. 2.

FIG. 2 is a schematic view of a portion of additive manufacturing system 100 including an imaging device 126. FIG. 3 is a schematic front view of imaging device 126 (shown in FIG. 2). Referring to FIGS. 2 and 3, in the exemplary embodiment, imaging device 126 includes high resolution imaging bar 200 and a light source 202. Both high resolution imaging bar 200 and light source 202 are coupled to re-coating device 124. Similar to re-coating device 124, high resolution imaging bar 200 and light source 202 are coupled in communication with controller 132 (shown in FIG. 1). Additionally, high resolution imaging bar 200 and light source 202 are displaced from powder bed 111 along the first direction (i.e. in a direction parallel to first axis 107). High resolution imaging bar 200 and light source 202 extend along the second direction (i.e. in a direction parallel to second axis 105) and are configured to move with re-coating device 124 along the third direction (i.e. in a direction parallel to third axis 103).

High resolution imaging bar 200 includes at least one detector array 204 and an imaging element 206 positioned between detector array 204 and particulate build material 110 within powder bed 111. In the exemplary embodiment, detector array 204 includes a linear detector array including a pixel array of 2000 pixels, or more, such that powder bed 111 is imaged at spatial imaging resolutions on a scale of approximately a tenth of a millimeter or less. For example, detector array 204 facilities image resolutions on a scale of approximately 50 microns or better. In alternative embodiments, detector array 204 includes any type of detector that facilitates operation of additive manufacturing system 100 as described herein.

In the exemplary embodiment, imaging element 206 is positioned at one end of detector array 204 between detector array 204 and powder bed 111 to enable providing clear imaging points on powder bed 111, build layer 116, and component 106, and to enable detector array 204 to be positioned in close proximity to powder bed 111. In the exemplary embodiment, imaging element 206 includes a single lens common to all elements of detector array 204 to facilitate imaging the width of powder bed 111 with the single lens. In the exemplary embodiment, detector array 204 is a single array. In alternative embodiments, detector array 204 includes as many arrays as facilitates operation of additive manufacturing system 100 as described herein.

In the exemplary embodiment, light source 202 emits visible light 208 to facilitate enabling high resolution imaging bar 200 generating the spatial imaging resolutions of each build layer 116 and the features contained therein. Light source 202 includes a plurality of light emitting diode (LED) lights. A first portion 212 of the LED lights are positioned to light powder bed 111 and build layer 116 from above, relative to the first direction. In the exemplary embodiment, the LED lights of first portion 212 are positioned to direct visible light 208 onto build layer 116 or component 106 at approximately a right angle in relation to build layer 116. Additionally, a second portion 214 of the LED lights are positioned at an acute angle relative to the surface of build layer 116 and are configured to direct visible light onto build layer 116 or component 106 to facilitate highlighting uneven features of build layer 116 or component 106.

In the exemplary embodiment, second portion 214 of the LED lights is positioned adjacent first portion 212 of the LED lights and extends along the second direction across powder bed 111. Second portion 214 of the LED lights are angled relative to powder bed 111 by an acute angle relative to the third direction. Further, in the exemplary embodiment, controller 132 facilitates turning on and off any number of the LED lights to facilitate highlighting certain build layer features. In alternative embodiments, light source 202 is positioned in any other orientation(s) that facilitates operation of additive manufacturing system 100 as described herein.

In operation, imaging device 126 facilitates imaging the build layers, such as build layers 116, during the build process. The images from imaging device 126 are then compared to the electronic build representation of three-dimensional component 106 to determine if there are any deviations from the desired three-dimensional geometry. More specifically, during operation of additive manufacturing system 100, energy beam 114 (shown in FIG. 1) is directed over selective portions of powder bed 111 forming a new build layer, such as build layer 116, of three-dimensional component 106. While re-coating device 124 moves along powder bed 111 to deposit another layer of particulate build material 110 (shown in FIG. 1) for the next build layer, imaging device 126 also makes a pass along powder bed 111 to generate spatial imaging resolutions of the most recent build layer, build layer 116, before the most recent build layer is covered by particulate build material 110.

During operation of re-coating device 124, imaging device 126 generates a continuous image of build layer 116. More specifically, imaging device 126 facilitates generating images showing feature changes of build layer 116 within a scale of at least a tenth of a millimeter and transmitting the images to computing device 134. In some embodiments, fast sampling is used in order to generate images for computing device 134 with a reduced file size. For example, the fast sampling will exclude the images of solely powder bed 111 such that build layer 116 is focused on within the image. Layer feature changes include, for example, images relating to layer misalignment, unevenness of build material, melt variations within each layer due to heat variations, and/or melt spatter within powder bed 111. Additionally, the angled LED lights also image any contours, such as balling and/or dome shaping, within build layer 116. These feature changes decrease the quality of build layer 116 and also the overall quality of three-dimensional component 106. Thereby, detecting the feature changes earlier in the manufacturing process provides time for corrections during the additive manufacturing process and/or saves manufacturing time and materials if a part cannot be corrected.

Furthermore, imaging device 126 also facilitates imaging the deposited layer of particulate build material 110 before energy beam 114 is directed over powder bed 111. During operation of additive manufacturing system 100, re-coating device 124 moves along powder bed 111 to deposit another layer of particulate build material 110 for the next build layer. As re-coating device 124 moves back to a home position, imaging device 126 generates a continuous image of the recent layer of particulate build material 110. More specifically, imaging device 126 directs angled visible light 210 towards powder bed 111 while re-coating device 124 moves back to the home position such that any features, such as unevenness and contouring of powder bed 111 are highlighted by light source 202. Image device 126 captures these images such that powder bed 111 features are detected. If contouring of powder bed 111 is detected, re-coating device 124 will make another pass along powder bed 111 to even out the layer of powdered particulate build material 110.

Figure 4:
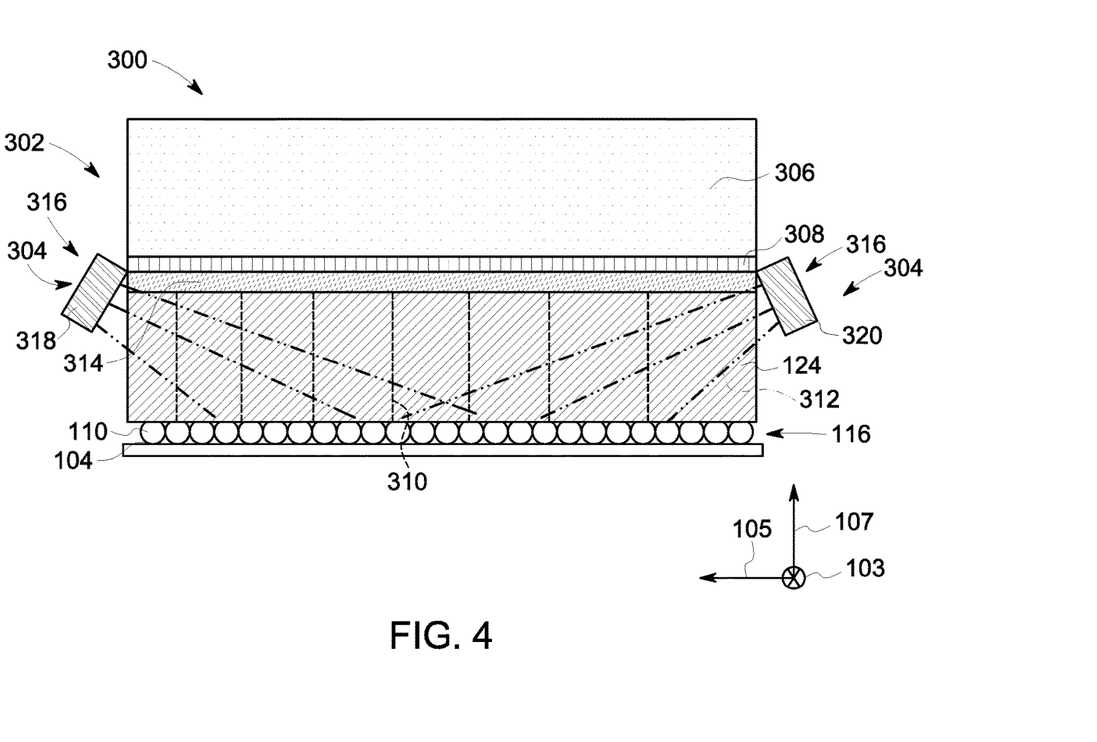
FIG. 4 is a schematic front view of an alternative imaging device for use with the additive manufacturing system shown in FIG. 1.

FIG. 4 is a schematic front view of an alternative imaging device 300 for use with additive manufacturing system 100 (shown in FIG. 1). In the exemplary embodiment, imaging device 300 includes a high resolution imaging bar 302 and a light source 304. Both high resolution imaging bar 302 and light source 304 are coupled to re-coating device 124. Similar to re-coating device 124, high resolution imaging bar 302 and light source 304 are coupled in communication with controller 132 (shown in FIG. 1). Additionally, high resolution imaging bar 302 and light source 304 are displaced from powder bed 111 along the first direction. High resolution imaging bar 302 and light source 304 extend along the second direction and are configured to move with re-coating device 124 along the third direction.

High resolution imaging bar 302 includes at least one detector array 306 and an imaging element 308 positioned between detector array 306 and particulate build material 110 within powder bed 111. In the exemplary embodiment, detector array 306 includes a linear detector array including a pixel array of at least 2000 pixels such that powder bed 111 is imaged at spatial imaging resolutions on a scale of approximately a tenth of a millimeter or less. For example, detector array 306 facilities image resolutions on a scale of approximately 50 microns or better. In the exemplary embodiment, detector array 306 includes a plurality of linear detector arrays. Alternatively, detector array 306 has any configuration that enables operation of imaging device 300 as described herein.

In the exemplary embodiment, imaging element 308 is positioned at one end of detector array 306 between detector array 306 and powder bed 111 to enable providing clear imaging points on powder bed 111, build layer 116, and component 106, and to enable detector array 306 to be positioned in close proximity to powder bed 111. Imaging element 308 includes a micro lens array including a plurality of small lenses approximately a millimeter in size to facilitate decreasing the overall height of imaging element 308. The lens array of imaging element 308 is positioned between powder bed 111 and the LED lights of light source 304 such that a narrow line of light, such as visible light 310 and/or 312, is projected onto powder bed 111 and positioned in an imaging area of high resolution imaging bar 302. In other alternative embodiments, imaging element 308 may be configured in any manner that facilitates operation of additive manufacturing system 100 as described herein.

In the exemplary embodiment, light source 304 emits visible light 310 to facilitate enabling high resolution imaging bar 302 generating the spatial imaging resolutions of each build layer 116 and the features contained therein. Light source 304 includes a plurality of light emitting diode (LED) lights. A first portion 314 of the LED lights are positioned to illuminate powder bed 111 and build layer 116 from above, relative to the first direction. In the exemplary embodiment, the LED lights of first portion 314 are positioned to direct visible light 310 to build layer 116 or component 106 at approximately a right angle relative to build layer 116. Additionally, a second portion 316 of the LED lights including a first array 318 and a second array 320 are positioned at acute angles relative to the surface of build layer 116 and are configured to direct visible light 312 to build layer 116 and component 106 from opposite ends of imaging device 300 to facilitate highlighting uneven features of build layer 116 and component 106.

In the exemplary embodiment, first array 318 and second array 320 of second portion 316 of the LED lights are positioned adjacent first portion 314 of the LED lights. First array 318 is positioned adjacent first portion 314 proximate an end of high resolution imaging bar 302, and second array 320 is positioned adjacent first portion 314 proximate an end of high resolution imaging bar 302 opposite first array 318. Second portion 316 of the LED lights is angled relative to powder bed 111 at an acute angle relative to the second direction. Further, in the exemplary embodiment, controller 132 facilitates turning on and off any number of the LED lights to facilitate highlighting certain build layer features. In alternative embodiments, light source 304 is positioned in any orientation that facilitates operation of additive manufacturing system 100 as described herein.

Figure 5:
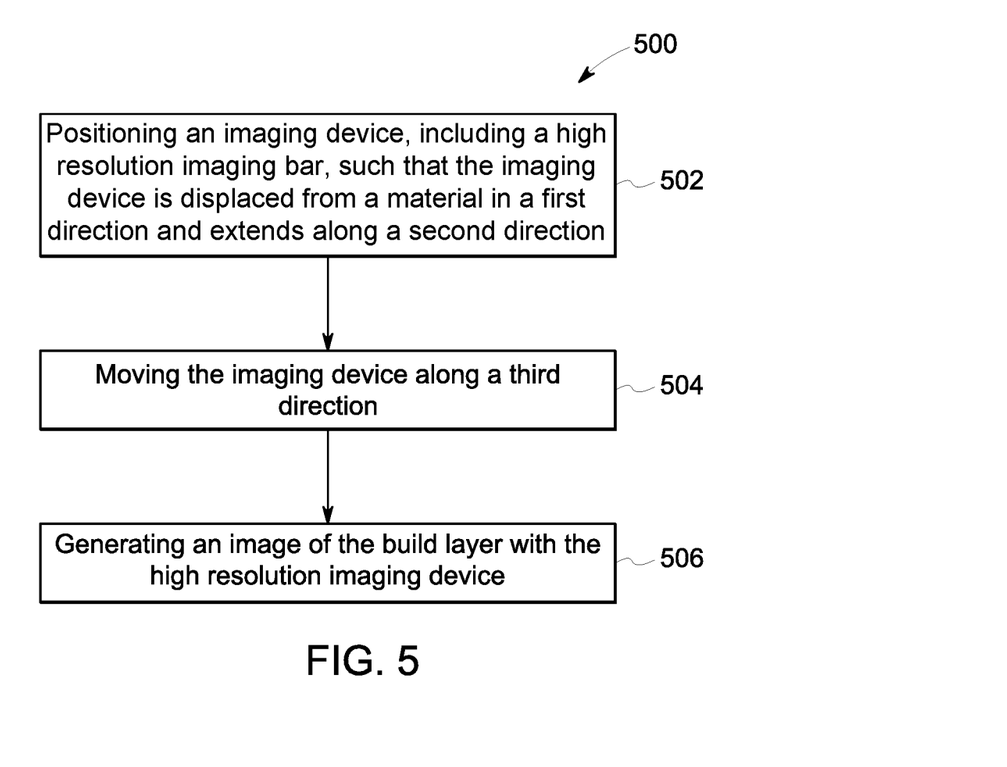
FIG. 5 is a flow chart illustrating an exemplary method for imaging a build layer in a powder bed.

FIG. 5 is a flow chart illustrating an exemplary method 500 for imaging build layer 116 in powder bed 111. Referring to FIGS. 1 and 5, method 500 includes positioning 502 an imaging device, such as imaging device 126, including a high resolution imaging bar, such as high resolution imaging bar 200, such that the imaging device is displaced from a powder bed, such as powder bed 111, in a first direction and extends along a second direction. Method 500 also includes moving 504 the imaging device along a third direction. Method 500 further includes generating 506 an image of the build layer, such as build layer 116, with the high resolution imaging device.

The above-described embodiments provide efficient imaging systems for use with additive manufacturing systems for higher resolution imaging of large manufactured components. Specifically, in the exemplary embodiments, the imaging device includes a high resolution imaging bar that extends across a material to be consolidated. The high resolution imaging bar is configured to generate an image of a build layer within the material and includes at least one detector array and an imaging element positioned between the at least one detector array and the material. The imaging device may be able to image a desired region of the material while stationary, or it may be coupled to a re-coating device assembly of the additive manufacturing system. As such, the high resolution imaging bar facilitates imaging the entirety of the material and detecting build layer features therein at resolutions that are on a scale of a tenth of a millimeter or better. By using the high resolution imaging bar, build layer features such as misalignment of the component, unevenness of the material, melt variations, and melt splatter are capable of being detected and addressed. Additionally, contours, such as balling or dome shaping, are also captured through an angled light source configuration. As such, the imaging systems described herein facilitate capturing more information than known static low exposure cameras. As such, the images that are compared to the electronic representation files of the component for verification enable earlier detection of potential problem areas during the additive manufacturing process, thereby, resulting in an additively manufactured component of increased quality. Additionally, early detection results in more time to correct problem areas of the component during the additive manufacturing process. Moreover, the early detection results enable unsalvageable parts to be discarded early in the manufacturing process, saving manufacturing time and material costs.

An exemplary technical effect of the systems and methods described herein includes at least one of: (a) imaging substantially all of the material to be consolidated and the build layer during formation of a component by moving the imaging device along the powder bed; (b) increasing imaging resolutions for the build layer of the component with an high resolution imaging device; (c) increasing build layer features captured by the imaging system to identify potential problem areas; (d) reducing product defects by identifying the problem features early in the manufacturing process; and (e) reducing product development cycle time.

Exemplary embodiments of systems and methods for imaging systems for additive manufacturing systems are described above in detail. The methods and systems are not limited to the specific embodiments described herein, but rather, components of systems and/or steps of the methods may be utilized independently and separately from other components and/or steps described herein. For example, the method may also be used in combination with other imaging systems, and are not limited to practice only with the additive manufacturing systems as described herein. Rather, the exemplary embodiments can be implemented and utilized in connection with many other applications.

Although specific features of various embodiments of the present disclosure may be shown in some drawings and not in others, this is for convenience only. In accordance with the principles of embodiments of the present disclosure, any feature of a drawing may be referenced and/or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An imaging device for an additive manufacturing system, the additive manufacturing system including a material, said imaging device comprising:
a light source comprising a plurality of LED lights, said plurality of LED lights comprising a first portion of LED lights positioned at a first angle relative to a build layer within the material and a second portion of LED lights comprising a first array positioned at a second angle relative to the build layer and a second array positioned at a third angle relative to the build layer, said plurality of LED lights configured to highlight a contoured shape feature of the build layer, wherein the first angle is a right angle, and wherein the second angle and the third angle are acute angles; and
a high resolution imaging bar displaced from the material along a first direction and extending along a second direction, said high resolution imaging bar comprising a first end and a second end opposite said first end, said light source coupled to said high resolution imaging bar, said first array positioned adjacent said first end and said second array positioned adjacent said second end, wherein said high resolution imaging bar is configured to generate an image of the build layer, said high resolution imaging bar comprising:
at least one detector array;
an imaging element positioned between said at least one detector array and the material.

2. The imaging device in accordance with claim 1, wherein said high resolution imaging bar is configured to generate the image with a resolution of less than or equal to 50 microns.

3. The imaging device in accordance with claim 1, wherein said high resolution imaging bar is coupled to a re-coating device and is configured to move along a third direction.

4. The imaging device in accordance with claim 1, wherein said high resolution imaging bar is configured to generate an image of a component prior to recoating of the component.

5. The imaging device in accordance with claim 1, wherein said high resolution imaging bar comprises at least one linear detector array.

6. The imaging device in accordance with claim 1, wherein said imaging element further comprises at least one of a micro lens array and a single lens.

7. An additive manufacturing system comprising:
a material for forming a component; and
an imaging device comprising:
- a light source comprising a plurality of LED lights, said plurality of LED lights comprising a first portion of LED lights positioned at a first angle relative to a build layer within the material and a second portion of LED lights comprising a first array positioned at a second angle relative to the build layer and a second array positioned at a third angle relative to the build layer, said plurality of LED lights configured to highlight a contoured shape feature of the build layer, wherein the first angle is a right angle, and wherein the second angle and the third angle are acute angles;
- a high resolution imaging bar displaced from the material along a first direction and extending along a second direction, said high resolution imaging bar comprising a first end and a second end opposite said first end, said light source coupled to said high resolution imaging bar, said first array positioned adjacent said first end and said second array positioned adjacent said second end, wherein said high resolution imaging bar is configured to generate an image of the build layer, said high resolution imaging bar comprising:
- at least one detector array; and
- an imaging element positioned between said at least one detector array and the material.

8. The additive manufacturing system in accordance with claim 7, wherein said high resolution imaging bar is configured to generate the image with a resolution of less than or equal to 50 microns.

9. The additive manufacturing system in accordance with claim 7, wherein said high resolution imaging bar is coupled to a re-coating device and is configured to move along a third direction.

10. The additive manufacturing system in accordance with claim 7, wherein said high resolution imaging bar is configured to generate an image of a component prior to recoating of the component.

11. The additive manufacturing system in accordance with claim 7, wherein said high resolution imaging bar comprises at least one linear detector array.

12. The additive manufacturing system in accordance with claim 7, wherein said imaging element further comprises at least one of a micro lens array and a single lens.

13. A method of imaging a build layer of a material within an additive manufacturing system, said method comprising:
- positioning an imaging device including a high resolution imaging bar such that the imaging device is displaced from the material in a first direction and extends along a second direction, the high resolution imaging bar including at least one detector array and an imaging element positioned between the at least one detector array and the material, the high resolution imaging bar having a first end and a second end opposite the first end;
- lighting the build layer using a light source coupled to the high resolution imaging bar, wherein the light source includes a plurality of LED lights, including a first portion of LED lights positioned at a first angle relative to the build layer and a second portion of LED lights including a first array positioned at a second angle relative to the build layer and a second array positioned at a third angle relative to the build layer, the first array positioned adjacent the first end and the second array positioned adjacent the second end, the plurality of LED lights configured to highlight a contoured shape feature of the build layer, wherein the first angle is a right angle, and wherein the second angle and the third angle are acute angles;
- moving the imaging device along a third direction; and
- generating an image of the build layer.

14. The method in accordance with claim 13 wherein generating an image comprises generating the image through a fast sampling process.

* * * * *